(12) United States Patent
Shionoya et al.

(10) Patent No.: US 9,347,562 B2
(45) Date of Patent: May 24, 2016

(54) CYLINDRICAL GASKET, METHOD FOR MANUFACTURING THE SAME, AND INSERTION-TYPE EXHAUST PIPE JOINT USING THE CYLINDRICAL GASKET

(71) Applicant: OILES CORPORATION, Tokyo (JP)

(72) Inventors: Shin-ichi Shionoya, Kanagawa (JP); Koichi Ishida, Kanagawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 14/358,971

(22) PCT Filed: Nov. 20, 2012

(86) PCT No.: PCT/JP2012/007444
§ 371 (c)(1),
(2) Date: May 16, 2014

(87) PCT Pub. No.: WO2013/080487
PCT Pub. Date: Jun. 6, 2013

(65) Prior Publication Data
US 2014/0312572 A1    Oct. 23, 2014

(30) Foreign Application Priority Data

Nov. 30, 2011 (JP) .................. 2011-262740

(51) Int. Cl.
*F16L 23/12* (2006.01)
*F16J 15/10* (2006.01)
(Continued)

(52) U.S. Cl.
CPC ............ *F16J 15/104* (2013.01); *B29C 43/003* (2013.01); *B29C 43/18* (2013.01); *F01N 13/08* (2013.01);
(Continued)

(58) Field of Classification Search
CPC . F01N 13/08; F01N 13/1811; F01N 13/1827; F01N 2470/24; F16J 15/12; F16J 15/126; F16J 15/061; F16L 21/065; F16L 23/18
See application file for complete search history.

(56) References Cited

U.S. PATENT DOCUMENTS 4,234,638 A * 11/1980 Yamazoe et al. ............... 428/133
4,383,694 A *  5/1983 Fontana ....................... 277/650
(Continued)

FOREIGN PATENT DOCUMENTS

EP   2 781 807      9/2014
JP   61-244815     10/1986
(Continued)

OTHER PUBLICATIONS

International Search Report for PCT/JP2012/007444 mailed Feb. 19, 2013.
(Continued)

*Primary Examiner* — Kristina Fulton
*Assistant Examiner* — Eugene G Byrd
(74) *Attorney, Agent, or Firm* — Nixon & Vanderhye P.C.

(57) ABSTRACT

A cylindrical gasket 27 includes a reinforcing member 70 made from a compressed belt-shaped metal wire net 5, a heat-resistant material 71 filled in meshes of the belt-shaped metal wire net 5 of the reinforcing member 70, and pores which are dispersedly distributed in the reinforcing member 70 and the heat-resistant material 71. An inner peripheral surface 23, an outer peripheral surface 24, and annular end faces 25 and 26 of the cylindrical gasket 27 are each formed by a smooth surface in which the heat-resistant material 71 and the reinforcing member 70 are present in mixed form. In the cylindrical gasket 27, the volume contents of the reinforcing member 70, the heat-resistant material 71, and the pores are 32 to 60%, 5 to 58%, and 10 to 35%, respectively.

2 Claims, 5 Drawing Sheets

(51) Int. Cl.
  *F16J 15/12* (2006.01)
  *F16L 21/06* (2006.01)
  *F01N 13/18* (2010.01)
  *B29C 43/00* (2006.01)
  *B29C 43/18* (2006.01)
  *F01N 13/08* (2010.01)
  *B29L 31/26* (2006.01)

(52) U.S. Cl.
  CPC .......... *F01N 13/185* (2013.01); *F01N 13/1827* (2013.01); *F16J 15/121* (2013.01); *F16J 15/126* (2013.01); *F16L 21/065* (2013.01); *B29L 2031/265* (2013.01); *F01N 2470/24* (2013.01)

(56) References Cited

U.S. PATENT DOCUMENTS

| | | | |
|---|---|---|---|
| 4,423,544 A * | 1/1984 | Kashmerick et al. | 29/527.2 |
| 4,462,603 A * | 7/1984 | Usher et al. | 277/627 |
| 4,514,458 A * | 4/1985 | Thorn et al. | 428/222 |
| 4,516,782 A * | 5/1985 | Usher | 264/258 |
| 4,559,249 A * | 12/1985 | Arigaya et al. | 428/34.1 |
| 4,601,476 A * | 7/1986 | Usher et al. | 277/627 |
| 4,659,091 A * | 4/1987 | Baasner et al. | 428/34.5 |
| 4,762,330 A * | 8/1988 | Lonne et al. | 277/627 |
| 4,871,181 A * | 10/1989 | Usher et al. | 277/627 |
| 4,902,024 A * | 2/1990 | Takenoshita | 277/627 |
| 5,451,064 A * | 9/1995 | Mercuri et al. | 277/625 |
| 6,025,018 A * | 2/2000 | Goldman et al. | 427/178 |
| 6,116,611 A * | 9/2000 | Ozaki et al. | 277/396 |
| 9,091,381 B2 * | 7/2015 | Kaida et al. | |
| 2002/0190483 A1* | 12/2002 | Murakami et al. | 277/627 |
| 2004/0066007 A1* | 4/2004 | Kubota et al. | 277/608 |
| 2004/0201182 A1* | 10/2004 | Notter et al. | 277/627 |
| 2004/0207162 A1* | 10/2004 | Kubota et al. | 277/650 |
| 2008/0211195 A1* | 9/2008 | Miyamoto et al. | 277/608 |
| 2010/0005792 A1* | 1/2010 | Saiki | 60/321 |
| 2010/0253011 A1* | 10/2010 | Maeda et al. | 277/626 |
| 2011/0000575 A1* | 1/2011 | Ito et al. | 138/177 |
| 2014/0312618 A1 | 10/2014 | Shionoya et al. | |

FOREIGN PATENT DOCUMENTS

| | | |
|---|---|---|
| JP | 47620/1993 | 6/1993 |
| JP | 06/146875 | 5/1994 |
| JP | 36273/1994 | 9/1994 |
| JP | 2003-206739 | 7/2003 |
| JP | 2004-3604 | 1/2004 |

OTHER PUBLICATIONS

Extended European Search Report issued in EP Application No. 12854412.9 dated Sep. 4, 2015.

* cited by examiner

CYLINDRICAL GASKET, METHOD FOR MANUFACTURING THE SAME, AND INSERTION-TYPE EXHAUST PIPE JOINT USING THE CYLINDRICAL GASKET

This application is the U.S. national phase of International Application No. PCT/JP2012/007444 filed 20 Nov. 2012 which designated the U.S. and claims priority to JP 2011-262740 filed 30 Nov. 2011, the entire contents of each of which are hereby incorporated by reference.

TECHNICAL FIELD

The present invention relates to a cylindrical gasket which is suitably used for an insertion-type exhaust pipe joint used in a motor vehicle such as an ATV (all-terrain vehicle: a four-wheeled buggy), a snowmobile, and a two-wheeled vehicle, a method of manufacturing the same, and an insertion-type exhaust pipe joint using the cylindrical gasket.

BACKGROUND ART

An insertion-type exhaust pipe joint includes an inner pipe and an outer pipe having an inside diameter substantially identical to the outside diameter of this inner pipe, wherein the outer pipe has an enlarged-diameter portion at its pipe end portion, and the inner pipe has a pipe end portion which is passed through the enlarged-diameter portion of the outer pipe and is fitted at its one end portion to the pipe end portion of the outer pipe, and wherein a gasket is fitted in an annular gap between the pipe end portion of the inner pipe and the enlarged-diameter portion of the outer pipe so as to seal the gap between the inner and outer pipes by a fastening band disposed on the outer peripheral surface of the outer pipe (refer to Patent Document 1, Patent Document 2, and Patent Document 3).

Further, as a gasket which is used for the above-described exhaust pipe joint, a gasket has been proposed wherein a strip is formed by cutting an expanded graphite sheet into a fixed width and length, a metal wire net cut to a length substantially identical to the length of the expanded graphite sheet is superposed on this strip, this superposed assembly is convoluted around a cylindrical core with the metal wire net placed on the inner side to fabricate a hollow cylindrical member, and this hollow cylindrical member is inserted in a die and is subjected to compression forming in its axial direction, whereby the metal wire net or the expanded graphite is exposed on its inner peripheral surface and its opposite end faces and outer peripheral surface are covered by the expanded graphite (refer to Patent Document 1 and Patent Document 3).

In addition, there has also been proposed an annular gasket wherein a gasket main body is provided by enclosing overall surfaces of an expanded graphite sheet by a metallic net, and the gasket main body is curved into a an annular shape and is compressed by a press machine such that the expanded graphite and the net are integrally secured to each other (refer to Patent Document 4).

In the expanded graphite which is used in the gaskets proposed in the above-described Patent Documents 1 to 3, its characteristics such as heat resistance, chemical resistance, and low-friction property are equivalent to those of normal graphite; however, such expanded graphite can be easily formed into a thin sheet or a block by being subjected to pressurization without using a binder, and an object thus obtained has a characteristic of being pliable and flexible unlike the aforementioned graphite.

Accordingly, the gasket, which is formed of expanded graphite and a metal wire net and is disposed between the inner pipe and an enlarged-diameter portion of the outer pipe of the exhaust pipe joint, undergoes expansion in volume due to the heat of exhaust gases flowing through the inner pipe and has pliability and flexibility, so that the gasket is capable of adapting itself well and fits to the gap between the inner pipe and the outer pipe, thereby making it possible to improve the sealability between the inner pipe and the outer pipe (refer to Patent Document 1).

PRIOR ART DOCUMENTS

Patent Documents

Patent Document 1: JP-A-61-244815
Patent Document 2: JP-UM-B-6-36273
Patent Document 3: JP-A-6-146875
Patent Document 4: JP-UM-A-5-47620

SUMMARY OF THE INVENTION

Problems to be Solved by the Invention

In recent years, however, the exhaust pipe has become large in size as a countermeasure for noise, and a catalytic converter has come to be mounted on the exhaust pipe as an emission control measure, so that an excessively large load has come to be applied to the insertion-type exhaust pipe joint. Due to traveling on a rough road, in particular, the joint portion is repeatedly subjected to vibrational load and bending torque, and prying repeatedly occurs between the inner and outer pipes.

With respect to the vibrational load, bending torque, and prying which repeatedly occur, the gasket is required to have pliability needed to exhibit sealability as well as rigidity for receiving a tightening force without the occurrence of a permanent set at the time of tightening with a fastening band. With respect to these two conflicting performances, the above-described conventional gaskets are respectively specialized in either one of the performances of pliability and rigidity, and it is difficult to render both performances compatible. As a result, in the case of a gasket which is specialized in rigidity, a problem occurs in sealability, while, in the case of a gasket which is specialized in pliability, a problem can possibly occur in that sealability of the gap between the inner and outer pipes is caused to decline due to such as the loosening of the fastening band caused by such as the permanent set of the gasket.

The present invention has been devised in view of the above-described aspects, and its object is to provide a cylindrical gasket which is suitably used for an insertion-type exhaust pipe joint and which has both sealability and rigidity, as well as a method of manufacturing the same, and an insertion-type exhaust pipe joint using the cylindrical gasket.

Means for Overcoming the Problems

A cylindrical gasket for use in an insertion-type exhaust pipe joint in accordance with the present invention comprises: a reinforcing member made from a compressed metal wire net; a heat-resistant material filled in meshes of the metal wire net of the reinforcing member and containing graphite, acid-treated graphite, and an inorganic binder which are compressed; and pores which are dispersedly distributed in the reinforcing member and the heat-resistant material, wherein the reinforcing member and the heat-resistant material are intertwined with each other so as to be provided with structural integrity, the reinforcing member is contained densely in a radial direction from a cylindrical inner peripheral surface to a cylindrical outer peripheral surface, and with respect to a total volume of the cylindrical gasket, the reinforcing member occupies a volume of 32 to 60%, the heat-resistant material occupies a volume of 5 to 58%, and the pores occupy a volume of 10 to 35%.

According to the cylindrical gasket in accordance with the present invention, since the percentage contents of the reinforcing member and the heat-resistant material are 32 to 60% and 5 to 58% in the volume ratio and the reinforcing member is contained densely in the radial direction from the cylindrical inner peripheral surface to the cylindrical outer peripheral surface, the tightening force due to the fastening band and the load due to vibrations are mainly borne by the reinforcing member made from the metal wire net, so that permanent set is difficult to occur. In addition, since the heat-resistant material is filled in the meshes of the metal wire net of that reinforcing member and the percentage content of the pores is 10 to 35% in the volume ratio, sealability also excels. Thus, it is possible to provide a cylindrical gasket which is suitably used for an insertion-type exhaust pipe joint and which has both sealability and rigidity.

In addition, according to the cylindrical gasket in accordance with the present invention, owing to the heat of exhaust gases flowing through the exhaust pipe of the exhaust pipe joint in which the cylindrical gasket is incorporated, the acid-treated graphite contained in the heat-resistant material undergoes expansion in volume, expands towards inner and outer peripheral surfaces and end faces of the cylindrical gasket, and seals the gap between the cylindrical gasket and the inner and outer peripheral surfaces of the exhaust pipe, thereby making it possible to further enhance the sealability of the cylindrical gasket.

Furthermore, according to the cylindrical gasket in accordance with the present invention, owing to the thermal action of exhaust gases flowing through the exhaust pipe of the exhaust pipe joint in which the cylindrical gasket is incorporated, a hardening binding characteristic is manifested in the inorganic binder contained in the heat-resistant material by such as condensation due to thermal dehydration and the transition of crystals due to high-temperature heating, thereby further enhancing the rigidity of the cylindrical gasket.

In the cylindrical gasket in accordance with the present invention, as the graphite which is contained in the heat-resistant material, at least one of natural graphite constituted of crystalline graphite, amorphous graphite, crystalline flake graphite, or vein graphite, artificial graphite constituted of kish graphite or pyrolytic graphite, and expanded graphite is suitably selected for use.

In the cylindrical gasket in accordance with the present invention, as the acid-treated graphite prior to expansion treatment which is contained in the heat-resistant material, a crystalline compound is suitably used which maintains a layered structure of carbon and is obtained by subjecting a powder of the aforementioned natural graphite or artificial graphite to acid treatment by allowing an inorganic acid to be inserted into layers of graphite, using an inorganic acid such as concentrated sulfuric acid, nitric acid, or selenic acid and a strong acidizing agent such as concentrated nitric acid, perchloric acid, perchlorate, permanganate, bichromate, or hydrogen peroxide.

In the cylindrical gasket in accordance with the present invention, as the inorganic binder which is contained in the heat-resistant material, at least one of the following may be selected for use: aluminum dihydrogen phosphate (monobasic aluminum phosphate) $[Al(H_2PO_4)_3]$, aluminum hydrogen phosphate (dibasic aluminum phosphate) $[Al_2(HPO_4)_3]$, magnesium dihydrogen phosphate (monobasic magnesium phosphate) $[Mg(H_2PO_4)_2]$, magnesium hydrogen phosphate (dibasic magnesium phosphate) $(MgHPO_4)$, calcium dihydrogen phosphate (monobasic calcium phosphate) $[Ca(H_2PO_4)_2]$, calcium hydrogen phosphate (dibasic calcium phosphate) $(CaHPO_4)$, and phosphoric acid $(H_3PO_4)$.

Each of these inorganic binders effects the binding of graphite contained in the heat-resistant material, the binding of graphite and acid-treated graphite, and the binding of the heat-resistant material to the meshes of the metal wire net of the reinforcing member, and the inorganic binder causes a hardening binding characteristic to be manifested by such as condensation due to thermal dehydration and the transition of crystals due to high-temperature heating owing to the thermal action of exhaust gases flowing through the exhaust pipe of the exhaust pipe joint in which the cylindrical gasket is incorporated, so that the inorganic binder exhibits the effect of enhancing the rigidity of the cylindrical gasket.

In the cylindrical gasket in accordance with the present invention, a mass ratio between the graphite and the acid-treated graphite which are contained in the heat-resistant material is preferably 1:0.01 to 0.5, and a mass ratio between the graphite and the acid-treated graphite, on the one hand, and the inorganic binder, on the other hand, is preferably 1:0.1 to 1.

If the mass of the acid-treated graphite is less than 0.01 with respect to the mass of the graphite taken as 1, the rate of volume expansion of the acid-treated graphite is small due to the thermal action of exhaust gases flowing through the exhaust pipe, with the result that there is a possibility of a reduction of the effect of sealing the gap between the inner pipe and the outer pipe of the exhaust pipe due to the volume expansion of the cylindrical gasket. On the other hand, if the mass of the acid-treated graphite exceeds 0.5 with respect to the mass of the graphite taken as 1, the rate of volume expansion of the acid-treated graphite, on the contrary, becomes excessively large due to the thermal action of exhaust gases flowing through the exhaust pipe, with the result that there is a possibility of causing a decline of the rigidity of the cylindrical gasket.

In addition, if the mass of the inorganic binder is less than 0.1 with respect to the masses of the graphite and the acid-treated graphite taken as 1, the effect of the inorganic binder as the binder is poor, so that the heat-resistant material becomes likely to fall off from the meshes of the metal wire net of the reinforcing member. On the other hand, if the mass of the inorganic binder exceeds 1 with respect to the masses of the graphite and the acid-treated graphite taken as 1, owing to the manifestation of a hardening binding characteristic in the inorganic binder owing to such as condensation due to thermal dehydration and owing to the transition of crystals due to high-temperature heating in addition to the action of the inorganic binder as the binder, there is a possibility of excessively enhancing the rigidity of the cylindrical gasket and causing a decline in the sealability.

In a method of manufacturing the cylindrical gasket in accordance with the present invention for use in an insertion-type exhaust pipe joint, the cylindrical gasket includes a reinforcing member made from a compressed belt-shaped metal wire net, a heat-resistant material filled in meshes of the belt-shaped metal wire net of the reinforcing member and containing graphite, acid-treated graphite, and an inorganic binder which are compressed, and pores which are dispersely distributed in the reinforcing member and the heat-resistant material, wherein the reinforcing member and the heat-resistant material are intertwined with each other so as to be provided with structural integrity, the reinforcing member is contained densely in a radial direction from a cylindrical inner peripheral surface to a cylindrical outer peripheral surface, and with respect to a total volume of the cylindrical gasket, the reinforcing member occupies a volume of 32 to 60%, the heat-resistant material occupies a volume of 5 to 58%, and the pores occupy a volume of 10 to 35%, the method of manufacturing a cylindrical gasket comprises the steps of: (1) compounding a graphite powder, an acid-treated graphite powder, an inorganic binder, and distilled water at a predetermined ratio and kneading them to fabricate a wet mixture containing the graphite powder, the acid-treated graphite powder, and the inorganic binder; (2) causing a tubular metal wire net obtained by weaving a fine metal wire to be passed between a pair of rollers so as to be compressed in a radial direction to fabricate a belt-shaped metal wire net; (3) supplying the mixture to both surfaces of the belt-shaped metal wire net and rolling the mixture by the rollers to fill meshes of the belt-shaped metal wire net with the mixture, and subsequently drying the mixture filled in the meshes of the belt-shaped metal wire net to remove water in the mixture, to thereby form a composite belt-shaped member in which the mixture is filled and held in the meshes of the belt-shaped metal wire net; (4) convoluting the composite belt-shaped member around a cylindrical core into a cylindrical shape by at least two turns to fabricate a tubular base member; and (5) inserting the tubular base member into a cylindrical hollow portion of a die and subjecting the tubular base member to compression forming in the die in an axial direction thereof.

According to the method of manufacturing the cylindrical gasket in accordance with the present invention, it is possible to obtain a cylindrical gasket which has both sealability and rigidity and which includes a reinforcing member made from a compressed belt-shaped metal wire net and a heat-resistant material filled in meshes of the belt-shaped metal wire net of the reinforcing member and compressed, wherein the reinforcing member and the heat-resistant material are intertwined with each other so as to be provided with structural integrity, the reinforcing member is contained densely in a radial direction from a cylindrical inner peripheral surface to a cylindrical outer peripheral surface, and the percentage contents of the reinforcing member, the heat-resistant material, and the pores are 32 to 60% for the reinforcing member, 5 to 58% for the heat-resistant material, and 10 to 35% for the pores in the volume ratio.

In the manufacturing method in accordance with the present invention, preferably, the graphite powder may be selected from at least one of natural graphite powder, artificial graphite powder, and expanded graphite powder; the expanded graphite powder may be a powder which is formed by cutting and pulverizing an expanded graphite sheet; the acid-treated graphite powder may be an acid-treated graphite powder prior to expansion treatment; and the inorganic binder may be selected from at least one of aluminum dihydrogen phosphate, aluminum hydrogen phosphate, magnesium dihydrogen phosphate, magnesium hydrogen phosphate, calcium dihydrogen phosphate, calcium hydrogen phosphate, and phosphoric acid. In a preferred embodiment, a mass ratio between the graphite powder and the acid-treated graphite powder contained in the wet mixture is 1:0.01 to 0.5, and a mass ratio between the graphite powder and the acid-treated graphite powder, on the one hand, and the inorganic binder, on the other hand, is 1:0.1 to 1.

An insertion-type exhaust pipe joint in accordance with the present invention comprises: an outer pipe having a pipe end portion, an enlarged-diameter cylindrical portion provided with an enlarged diameter at the pipe end portion via an annular shoulder portion, an open end portion provided at one axial end portion of the enlarged-diameter cylindrical portion, a flange portion provided on an outer peripheral surface of the open end portion in such a manner as to extend radially outwardly, and a plurality of slits provided in the enlarged-diameter cylindrical portion and in the flange portion in such a manner as to extend axially from an annular end face of the open end portion and to be arranged equidistantly in a circumferential direction; an inner pipe having a pipe end portion which is passed through an interior of the enlarged-diameter cylindrical portion of the outer pipe and is fitted at one axial end portion thereof to the pipe end portion of the outer pipe, and a flange which is provided uprightly on an outer peripheral surface of another axial end portion of the pipe end portion; the above-described cylindrical gasket which is fitted in an annular gap between a cylindrical outer surface of the pipe end portion of the inner pipe and a cylindrical inner surface of the enlarged-diameter cylindrical portion of the outer pipe; and a fastening band which is disposed on a cylindrical outer surface of the enlarged-diameter cylindrical portion of the outer pipe so as to press the cylindrical inner surface of the enlarged-diameter cylindrical portion of the outer pipe against the cylindrical outer peripheral surface of the cylindrical gasket by being tightened, through which pressing the fastening band presses the cylindrical inner peripheral surface of the cylindrical gasket against the cylindrical outer surface of the pipe end portion of the inner pipe, wherein, in the annular gap, the cylindrical gasket disposed with an annular end face of one axial end portion thereof abutting against the flange of the inner pipe is so arranged that the acid-treated graphite contained in the heat-resistant material is adapted to undergo expansion in volume owing to the heat of exhaust gases flowing through the inner pipe, so as to seal a gap between the cylindrical outer peripheral surface of the cylindrical gasket and a cylindrical inner peripheral surface of the enlarged-diameter cylindrical portion of the outer pipe and a gap between the cylindrical inner peripheral surface of the cylindrical gasket and the cylindrical outer surface of the pipe end portion of the inner pipe and to seal a space formed by one end face of the cylindrical gasket, the pipe end portion of the inner pipe, and the annular shoulder portion of the enlarged-diameter portion of the outer pipe.

According to the insertion-type exhaust pipe joint in accordance with the present invention, the cylindrical gasket, which is fitted in the annular gap between the outer peripheral surface of the pipe end portion of the inner pipe and the cylindrical inner surface of the enlarged-diameter cylindrical portion of the outer pipe, has both sealability and rigidity since the volume contents of the reinforcing member, the heat-resistant material, and the pores with respect to the entire portion are set to be 32 to 60% for the reinforcing member, 5 to 58% for the heat-resistant material, and 10 to 35% for the pores. As a result, the sealability at the gap between the inner pipe and the outer pipe is improved, and the leakage of exhaust gases from that gap is prevented as practically as possible.

In addition, the cylindrical gasket is so arranged that the acid-treated graphite contained in the heat-resistant material undergoes expansion in volume owing to the heat of exhaust gases flowing through the inner pipe, such that the cylindrical outer peripheral surface thereof is brought into tight contact with the cylindrical inner peripheral surface of the enlarged-diameter cylindrical portion of the outer pipe and the cylindrical inner peripheral surface thereof is brought into tight contact with the outer peripheral surface of the inner pipe so as to seal the gap therebetween, and such that the one end face seals a space formed by the pipe end portion of the inner pipe and the annular shoulder portion of the enlarged-diameter portion of the outer pipe. Therefore, it is possible to further improve the sealability of the gap between the inner pipe and the outer pipe.

At the time when the cylindrical gasket which undergoes volume expansion is inserted onto the inner peripheral surface of the enlarged-diameter portion of the outer pipe in the exhaust pipe joint, the dimensional tolerance of the cylindrical gasket can be set to a minus tolerance with respect to the dimension of the inner peripheral surface of the enlarged-diameter portion of the outer pipe, so that the operational efficiency in the insertion of the cylindrical gasket can be improved.

Furthermore, with the cylindrical gasket, a hardening binding characteristic is manifested in the inorganic binder contained in the heat-resistant material by such as condensation due to thermal dehydration and the transition of crystals due to high-temperature heating by virtue of the action of the heat of exhaust gases flowing through the exhaust pipe, and the rigidity is thereby enhanced further. Hence, defects such as permanent set do not occur, and rigidity can be maintained over extended periods of time.

Advantages of the Invention

According to the present invention, since the percentage contents of the reinforcing member, the heat-resistant material, and the pores are set to 32 to 60% for the reinforcing member, 5 to 58% for the heat-resistant material, and 10 to 35% for the pores in the volume ratio, it is possible to provide a cylindrical gasket having both sealability and rigidity as well as a method of manufacturing the same. In addition, as the cylindrical gasket is incorporated in the insertion-type exhaust pipe joint, the acid-treated graphite contained in the heat-resistant material of the cylindrical gasket undergoes volume expansion due to the heat of exhaust gases flowing through the inner pipe and hence makes it possible to improve sealability of the gap between the inner pipe and the outer pipe; therefore, it is possible to provide an insertion-type exhaust pipe joint which is capable of preventing as practically as possible the leakage of exhaust gases from that gap.

MODE FOR CARRYING OUT THE INVENTION

Figure 1:
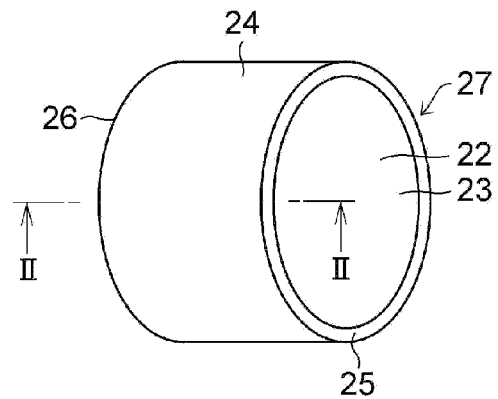
FIG. 1 is an explanatory perspective view of a cylindrical gasket which is manufactured in one embodiment of the present invention.

Next, a more detailed description will be given of the present invention on the basis of the embodiments illustrated in the drawings. It should be noted that the present invention is not limited to these embodiments.

A description will be given of constituent materials of a cylindrical gasket and a method of manufacturing the cylindrical gasket in accordance with the invention.

<Heat-Resistant Material (Mixture): Concerning Acid-Treated Graphite>

An acid-treated graphite powder used as a heat-resistant material is a crystalline compound which maintains a layered structure of carbon and is obtained by subjecting a powder of natural graphite or artificial graphite to acid treatment by allowing an inorganic acid to be inserted into layers of graphite, using an inorganic acid such as concentrated sulfuric acid, nitric acid, or selenic acid and a strong acidizing agent such as concentrated nitric acid, perchloric acid, perchlorate, permanganate, bichromate, or hydrogen peroxide.

A description will be given of one embodiment of a method of producing the acid-treated graphite powder. While concentrated sulfuric acid of a 98% concentration is being agitated as an inorganic acid, a 60% aqueous solution of hydrogen peroxide is added to it as a strong oxidizing agent, and this solution is used as a reaction solution. This reaction solution is cooled and kept at a temperature of 10° C., natural flake graphite powder having a particle size of 30 to 80 meshes is added to the reaction solution, and reaction is allowed to take place for 30 minutes. After the reaction, acid-treated graphite powder is separated by suction filtration, and a cleaning operation is repeated twice in which the acid-treated graphite powder is agitated in water for 10 minutes and is then subjected to suction filtration, thereby sufficiently removing the sulfuric acid content from the acid-treated graphite powder. Then, the acid-treated graphite powder with the sulfuric acid sufficiently removed is dried for 3 hours in a drying furnace held at a temperature of 110° C., and this is used as an acid-treated graphite powder.

<Heat-Resistant Material (Mixture): Concerning Graphite>

Graphite powder used as the heat-resistant material is selected from at least one of a natural graphite powder constituted of at least one of crystalline graphite, amorphous graphite, and crystalline flake graphite, an artificial graphite powder constituted of at least one of kish graphite and pyrolytic graphite, and an expanded graphite powder.

Here, the expanded graphite powder is an expanded graphite powder (expansion rate: 240 to 300 times) which is obtained by subjecting the above-described acid-treated graphite powder to heating (expansion) treatment for 1 to 10 seconds at temperatures of 950 to 1200° C. to produce cracked gas, such that the gaps between graphite layers are expanded by its gas pressure. This expanded graphite powder can be used as the heat-resistant material in the present invention, but since this expanded graphite powder has a very low bulk density of 0.05 g/cm$^2$, it is very difficult to handle. Accordingly, in the present invention, it is preferable to use as the expanded graphite powder a pulverized expanded graphite powder which is obtained by feeding the aforementioned expanded graphite powder to a twin roller apparatus adjusted to a desired roll nip so as to be subjected to roll forming to thereby form an expanded graphite sheet having a desired thickness, and then by cutting this expanded graphite sheet and pulverizing it by a pulverizing machine. By using the expanded graphite sheet, it is possible to make effective use of otherwise wasteful scraps, i.e., so-called edge material, which is produced, for instance, at the time of cutting the expanded graphite sheet along a desired shape, thereby making it possible to attain a reduction of the material cost of the expanded graphite powder and, hence, making it possible to attain a cost reduction of the cylindrical gasket itself.

<Heat-Resistant Material (Mixture): Concerning Inorganic Binder>

As an inorganic binder which acts as a binding agent for holding a mixed powder of the graphite powder and the acid-treated graphite powder onto a belt-shaped metal wire net serving as a reinforcing member and in its meshes simultaneously with the binding of particles of the aforementioned graphite powder, at least one of the following is selected for use: aluminum dihydrogen phosphate, aluminum hydrogen phosphate, magnesium dihydrogen phosphate, magnesium hydrogen phosphate, calcium dihydrogen phosphate, calcium hydrogen phosphate, and phosphoric acid.

<Concerning Reinforcing Member>

As a metal wire net serving as the reinforcing member, a knitted metal wire net, a tabular knitted metal wire net, or particularly a tubular knitted metal wire net constituted by a cylindrical knitted metal wire net is suitably used which is formed by knitting one or more fine metal wires including, as an iron-based wire, a stainless steel wire made of such as austenitic stainless steels SUS 304, SUS 310S, and SUS 316, a ferritic stainless steel SUS 430, an iron wire (JIS-G-3532), or a galvanized steel wire (JIS-G-3547), or, as a copper wire, a wire member made of a copper-nickel alloy (cupro-nickel) wire, a copper-nickel-zinc alloy (nickel silver) wire, a brass wire, or a beryllium copper wire.

Figure 4:
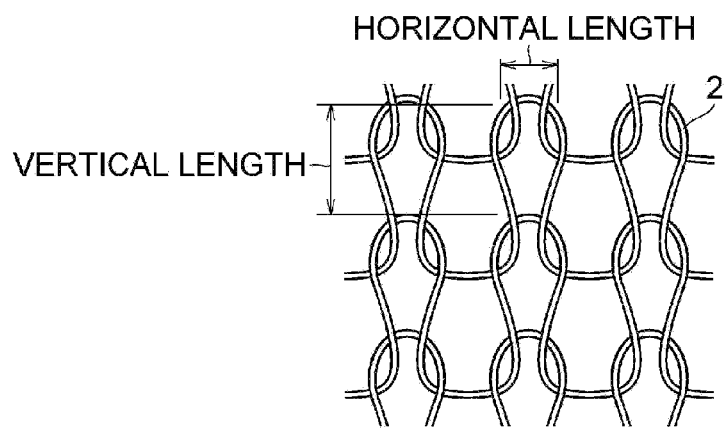
FIG. 4 is an explanatory plan view illustrating meshes of a metal wire net of the reinforcing member.

As the fine metal wire for forming the metal wire net, a fine metal wire whose diameter is 0.05 to 0.50 mm or thereabouts is used. As the metal wire net for the reinforcing member knitted by the fine metal wire of that diameter, one whose mesh size (see FIG. 4 illustrating a knitted metal wire net) is 1.5 to 6.0 mm long and 1.0 to 5.0 mm wide or thereabouts is suitably used.

Next, referring to the drawings, a description will be given of a method of manufacturing a cylindrical gasket which is constituted of the above-described constituent materials.

(First Process)

A wet mixture 1 is fabricated by mixing the following components at a ratio of predetermined amounts and by kneading them: a graphite powder selected from at least one of a natural graphite powder, an artificial graphite powder, and an expanded graphite powder which are respectively obtained by pulverizing natural graphite, artificial graphite, expanded graphite, and an expanded graphite sheet as an acid-treated graphite powder; an inorganic binder which is selected from at least one of aluminum dihydrogen phosphate, aluminum hydrogen phosphate, magnesium dihydrogen phosphate, magnesium hydrogen phosphate, calcium dihydrogen phosphate, calcium hydrogen phosphate, and phosphoric acid; an acid-treated graphite powder; and distilled water. The mass ratio between the graphite powder and the acid-treated graphite powder which are contained in this wet mixture 1 is preferably set to 1:0.01 to 0.5, and the mass ratio of the inorganic binder with respect to masses of graphite and acid-treated graphite taken as 1 is preferably set to 0.1 to 1.

(Second Process)

Figure 3:
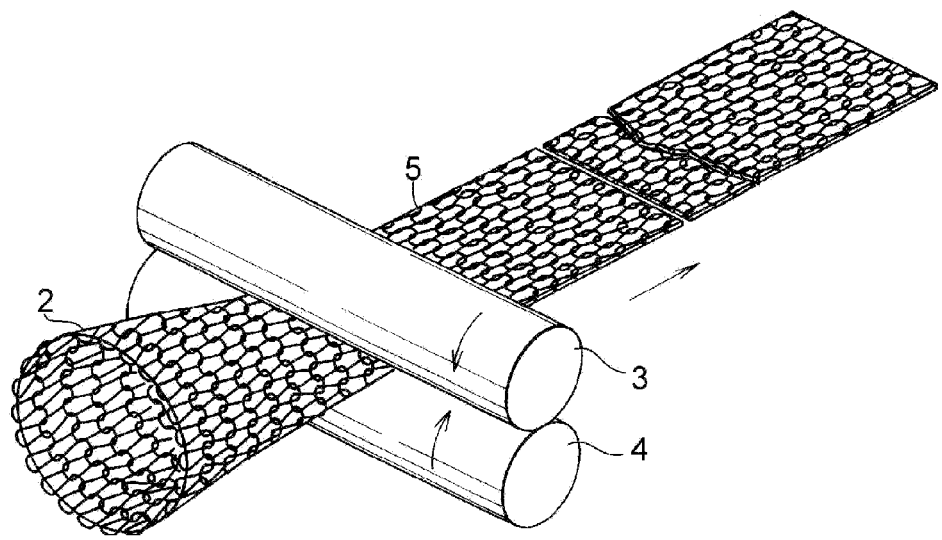
FIG. 3 is an explanatory perspective view of a method of forming a reinforcing member in the process of manufacturing the cylindrical gasket in accordance with the present invention.

As shown in FIG. 3, a tubular metal wire net 2, which is made from a hollow cylindrical knitted metal wire net obtained by continuously knitting a fine metal wire with a diameter of 0.05 to 0.50 mm by a knitting machine (not shown) and whose mesh size is 1.5 to 6.0 mm long and 1.0 to 5.0 mm wide or thereabouts (see FIG. 4), is passed between a pair of rollers 3 and 4 to thereby fabricate a belt-shaped metal wire net 5 having a desired width.

(Third Process)

Figure 5:
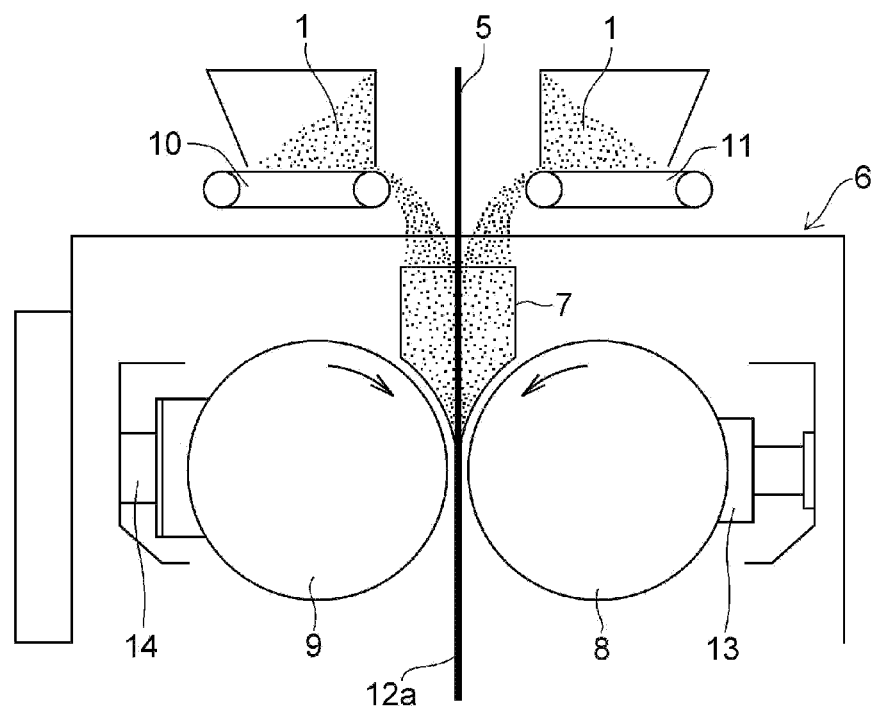
FIG. 5 is an explanatory cross-sectional view of a method of forming a composite belt-shaped member in the process of manufacturing the cylindrical gasket in accordance with the present invention.

As shown in FIG. 5, the belt-shaped metal wire net 5 is inserted into a hopper 7 of a rolling apparatus 6, an inserting end portion of the belt-shaped metal wire net 5 is passed between a pair of rollers 8 and 9, and the wet mixture 1 is fed from conveyors 10 and 11 to the interior of the hopper 7 bisected by the belt-shaped metal wire net 5. The mixture 1 fed into the hopper 7 is supplied to the belt-shaped metal wire net 5 between the rollers 8 and 9, and the mixture 1 is rolled between the rollers 8 and 9 to fill the meshes of the belt-shaped metal wire net 5 with the mixture 1, thereby fabricating a composite belt-shaped base material 12a in which the belt-shaped metal wire net 5 and the mixture 1 held on the belt-shaped metal wire net 5 and in its meshes are integrated. This composite belt-shaped base material 12a is taken up in roll form. It should be noted that, in FIG. 5, reference numeral 13 denotes a load cell disposed on the one roller 8 side, and 14 denotes a fluid cylinder disposed on the other roller 9 side.

(Fourth Process)

Figure 6:
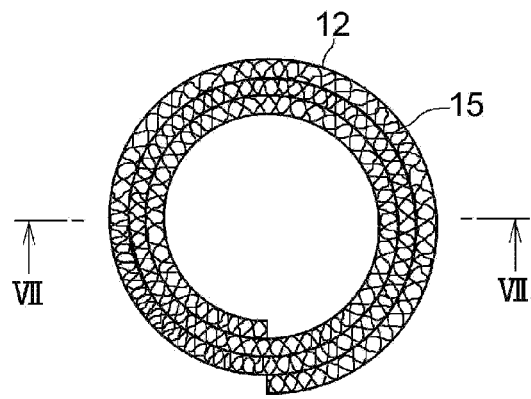
FIG. 6 is an explanatory plan view of a tubular base member in the process of manufacturing the cylindrical gasket in accordance with the present invention.
Figure 7:
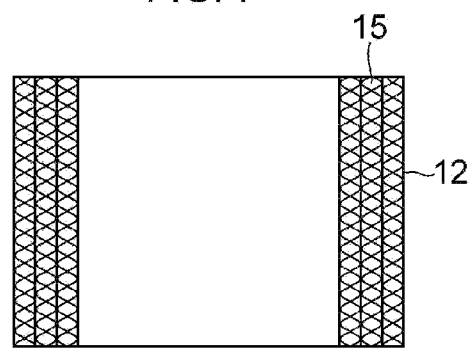
FIG. 7 is an explanatory cross-sectional view, taken in the direction of arrows along line VII-VII, of the tubular base member shown in FIG. 6.

After the composite belt-shaped base material 12a taken up in roll form is dried in a drying furnace to remove the water content from the mixture 1 in the composite belt-shaped base material 12a through evaporation and dissipation, and the composite belt-shaped base material 12a is subsequently cut into a desired length. A tubular base member 15 is fabricated by convoluting this cut composite belt-shaped member 12 around a core (not shown) by at least two turns, or by 3 turns in Embodiments, as shown in FIGS. 6 and 7.

(Fifth Process)

Figure 8:
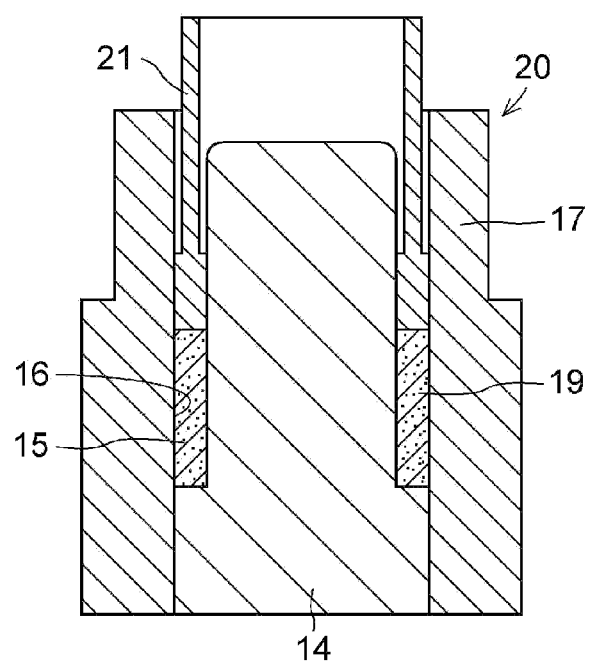
FIG. 8 is an explanatory cross-sectional view illustrating a state in which the tubular base member is inserted in a die in the process of manufacturing the cylindrical gasket in accordance with the present invention.

A die 20 shown in FIG. 8 is prepared in the interior of which a hollow cylindrical portion 19 is formed as a stepped core 18 is fittingly inserted in a through hole 16 of a cavity 17 having the through hole 16 in its interior. The tubular base member 15 is then fitted over the stepped core 18 of the die 20.

Figure 2:
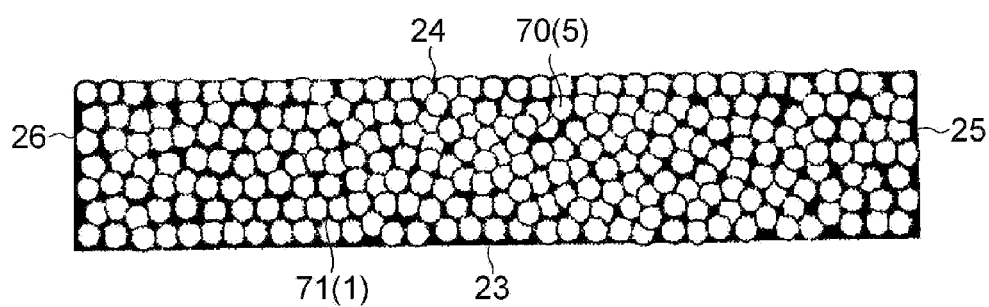
FIG. 2 is an explanatory schematic cross-sectional view taken in the direction of arrows along line II-II of FIG. 1.

The tubular base member 15 inserted in the hollow cylindrical portion 19 of the die 20 is subjected to compression forming by a punch 21 under a pressure of 98 to 294 N/mm$^2$ (1 to 3 tons/cm$^2$) in the direction of the core axis. Thus, a cylindrical gasket 27 is fabricated which includes a cylindrical inner peripheral surface 23 defining a through hole 22, a cylindrical outer peripheral surface 24, and annular end faces 25 and 26, as shown in FIGS. 1 and 2.

The cylindrical gasket 27 fabricated by the compression forming of the tubular base member 15 includes a reinforcing member 70 made from the compressed belt-shaped metal wire net 5; a heat-resistant material 71 filled in the meshes of the belt-shaped metal wire net 5 of the reinforcing member 70 and constituted by the mixture 1 including the acid-treated graphite powder, the graphite powder, and the inorganic binder which are compressed; and pores which are dispersedly distributed in the reinforcing member 70 and the heat-resistant material 71. The reinforcing member 70 and the heat-resistant material 71 are intertwined with each other so as to be provided with structural integrity, and the reinforcing member 70 is contained densely in the radial direction from the cylindrical inner peripheral surface 23 to the cylindrical outer peripheral surface 24. The inner peripheral surface 23, the outer peripheral surface 24, and the annular end faces 25 and 26 of the cylindrical gasket 27 are each formed by a smooth surface in which the heat-resistant material 71 and the reinforcing member 70 are present in mixed form. In the cylindrical gasket 27, the volume contents of the reinforcing member 70, the heat-resistant material 71, and the pores are 32 to 60%, 5 to 58%, and 10 to 35%, respectively.

The relative amount of the content of the pores contained in the cylindrical gasket 27 is related to the relative quality of the sealability of the cylindrical gasket 27. In particular, if the content of the pores is less than 10% in the volume ratio, the rigidity of the cylindrical gasket 27 itself can be increased, but a difficulty in the insertability of the cylindrical gasket 27 with respect to the inner peripheral surface of the exhaust pipe is entailed, and its initial conformability with the inner peripheral surface of the exhaust pipe is poor, with the result that there is a possibility of causing a decline in sealability. If the content of the pores exceeds 35% in the volume ratio, a large number of continuous pores appear in the cylindrical gasket 27, possibly causing a decline in the sealability and a decline in the rigidity of the cylindrical gasket 27. Accordingly, the content of the pores contained in the cylindrical gasket 27 is preferably 10 to 35%, more preferably 15 to 30%, in the volume ratio.

Figure 9:
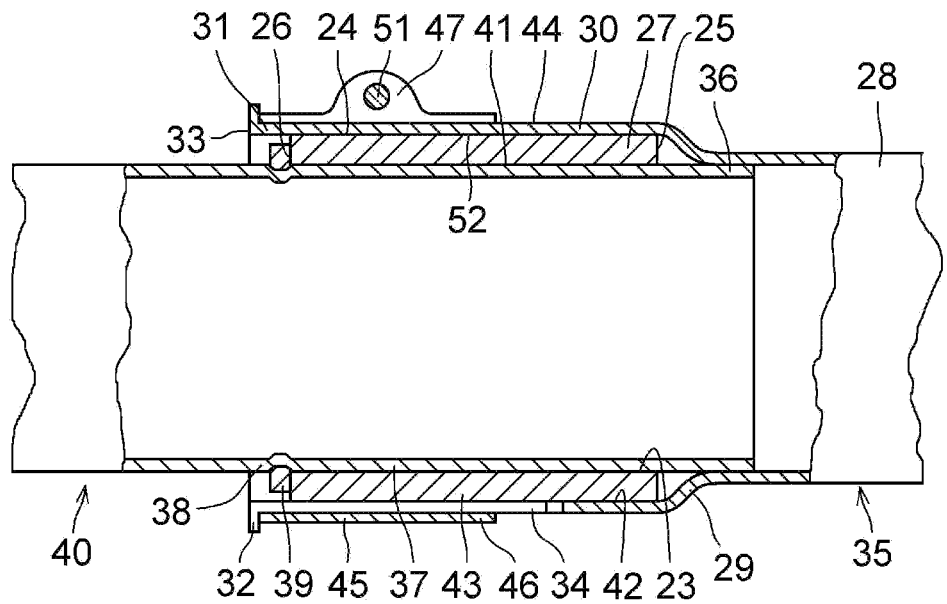
FIG. 9 is an explanatory longitudinal cross-sectional view of an insertion-type exhaust pipe joint incorporating one embodiment of the cylindrical gasket in accordance with the present invention.
Figure 10:
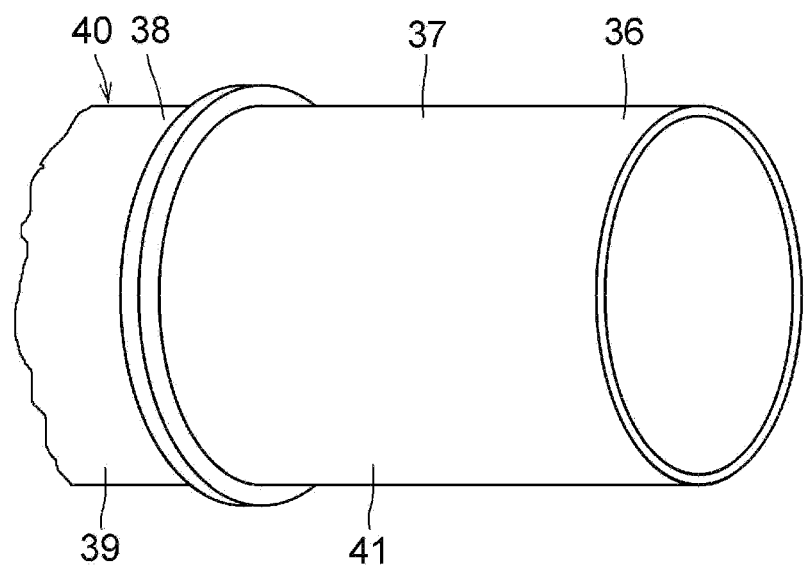
FIG. 10 is an explanatory perspective view of an inner pipe of the insertion-type exhaust pipe joint.
Figure 11:
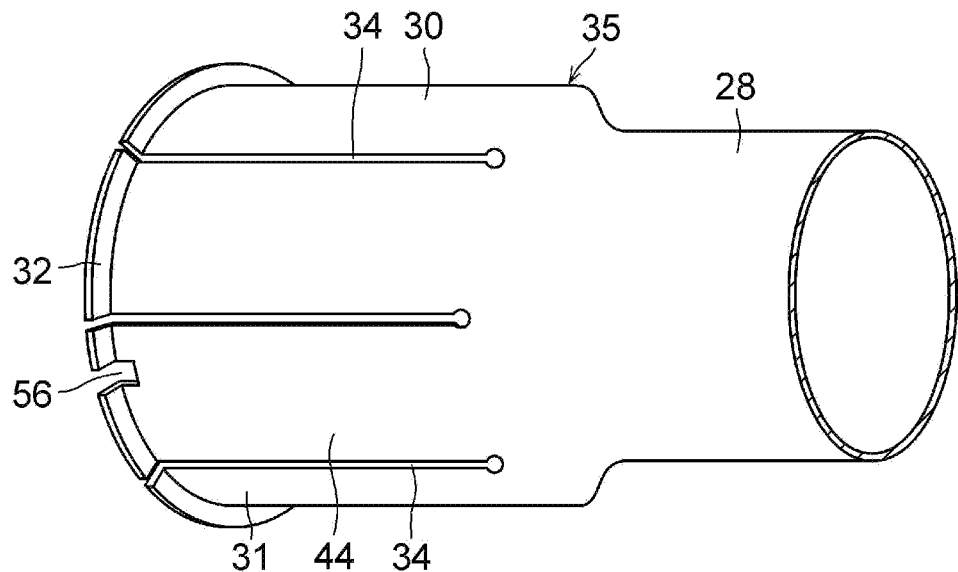
FIG. 11 is an explanatory perspective view of an outer pipe of the insertion-type exhaust pipe joint.
Figure 12:
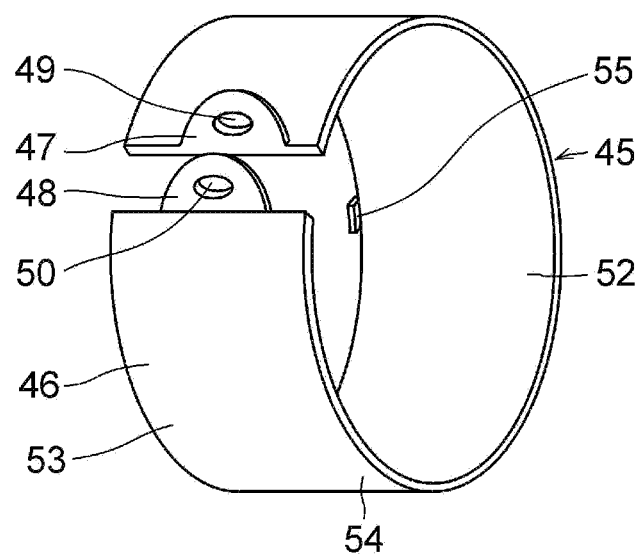
FIG. 12 is an explanatory perspective view of a fastening band of the insertion-type exhaust pipe joint.

The cylindrical gasket 27 is used by being incorporated in an insertion-type exhaust pipe joint shown in FIG. 9. The insertion-type exhaust pipe joint shown in FIG. 9 includes an outer pipe 35 (see FIGS. 9 and 11) having a pipe end portion 28, an enlarged-diameter cylindrical portion 30 formed with an enlarged diameter at the pipe end portion 28 via a tapered annular shoulder portion 29, an open end portion 31 formed at one axial end portion of the enlarged-diameter cylindrical portion 30, a flange portion 32 formed on an outer peripheral surface of the open end portion 31 in such a manner as to extend radially outwardly, and a plurality of slits 34 provided in the enlarged-diameter cylindrical portion 30 and in the flange portion 32 in such a manner as to extend axially from an open end face 33 of the open end portion 31 and to be arranged equidistantly in the circumferential direction; an inner pipe 40 (see FIGS. 9 and 10) having a pipe end portion 37 which is passed through the interior of the enlarged-diameter cylindrical portion 30 of the outer pipe 35 and is fitted at one axial end portion 36 to the pipe end portion 28 of the outer pipe 35, and a flange 39 which is provided uprightly on a cylindrical outer surface of another axial end portion 38 of the pipe end portion 37; the cylindrical gasket 27 which is fitted in an annular space 43 between a cylindrical outer surface 41 of the pipe end portion 37 of the inner pipe 40 and a cylindrical inner surface 42 of the enlarged-diameter cylindrical portion 30 of the outer pipe 35; and a fastening band 45 (see FIGS. 9 and 12) which is disposed on a cylindrical outer surface 44 of the enlarged-diameter cylindrical portion 30. The fastening band 45, which has a cylindrical main body 46 and a pair of lugs 47 and 48 provided in such a manner as to integrally project radially outwardly from the cylindrical main body 46, is so adapted that as the cylindrical main body 46 is made to undergo a reduction in diameter by the tightening of a tightening tool 51 such as a bolt which is inserted into through holes 49 and 50 of the pair of lugs 47 and 48, the fastening band 45 presses the cylindrical inner surface 42 of the enlarged-diameter cylindrical portion 30 of the outer pipe 35 against the cylindrical outer peripheral surface 24 of the cylindrical gasket 27 by means of an inner peripheral surface 52 of the cylindrical main body 46, and through this pressing the fastening band 45 presses the cylindrical inner peripheral surface 23 of the cylindrical gasket 27 against the cylindrical outer surface 41 of the pipe end portion 37 of the inner pipe 40. The cylindrical gasket 27 in the annular space 43 is disposed with the end face 26 of one axial end portion thereof abutting against the flange 39 of the inner pipe 40, and thus the cylindrical gasket 27 is adapted to hermetically seal the annular space 43 between the inner pipe 40 and the outer pipe 35 to thereby prevent the leakage of exhaust gases from the annular space 43.

In the above-described insertion-type exhaust pipe joint, a hook portion 55 projecting radially inwardly is provided at one end portion 53 of the axial end portions 53 and 54 of the fastening band 45. The hook portion 55 has a cross section similar to that of a notched portion 56 formed in the flange portion 32 of the enlarged-diameter cylindrical portion 30 of the outer pipe 35, and when the fastening band 45 is fitted on the cylindrical outer surface 44 of the enlarged-diameter cylindrical portion 30 of the outer pipe 35, the hook portion 55 freely passes through the notched portion 56 formed in the flange portion 32, and is brought into contact at an inner surface thereof with an axial side surface of the flange 39 of the inner pipe 40 and engages the flange 39, so that the outer pipe 35 at the flange portion 32 axially engages the fastening band 45. As a result, even if a force which tends to separate the inner pipe 40 and the outer pipe 35 in the axial direction, the inner pipe 40 and the outer pipe 35 are prevented from becoming disengaged from each other.

The cylindrical gasket 27 which is used by being incorporated in the insertion-type exhaust pipe joint undergoes expansion in volume owing to the heat of exhaust gases flowing through the inner pipe 40 of the exhaust pipe joint, so that the cylindrical outer peripheral surface 24 of the cylindrical gasket 27 and the cylindrical inner surface 42 of the enlarged-diameter cylindrical portion 30 of the outer pipe 35 are brought into tight contact with each other, the cylindrical inner peripheral surface 23 of the cylindrical gasket 27 and the cylindrical outer surface 41 of the pipe end portion 37 of the inner pipe 40 are brought into tight contact with each other, and a space S is sealed which is formed by the pipe end portion 37 of the inner pipe 40, the annular end face 25 at the other end portion of the cylindrical gasket 27, and the annular shoulder portion 29 of the enlarged-diameter cylindrical portion 30 of the outer pipe 35. Therefore, the sealability of the gap among the inner pipe 40, the outer pipe 35, and the cylindrical gasket 27 is improved further, and therefore the leakage of exhaust gases from that gap is further prevented.

In the cylindrical gasket 27, owing to the thermal action of exhaust gases flowing through the inner pipe 40 of the exhaust pipe joint, a hardening binding characteristic is manifested in the inorganic binder in the heat-resistant material forming the cylindrical gasket 27 by such as condensation due to thermal dehydration and the transition of crystals due to heat, and the rigidity of the heat-resistant material is hence enhanced, so that the cylindrical gasket 27 does not undergo defects such as permanent set, thereby allowing the rigidity of the cylindrical gasket 27 to be maintained over extended periods of time.

It should be noted that, in the present invention, with the cylindrical gasket 27 whose rigidity has been enhanced, the permanent set and the like are not produced even by a large tightening force exerted by the fastening band 45, and the relaxation of the fastening power due to a decline in the tightening force of the fastening band 45 does not occur, so that the hook portion 55 formed on the fastening band 45 and the notched portion 56 formed in the flange portion 32 of the outer pipe 35 may not necessarily be provided.

EXAMPLES

Next, the present invention will be described in detail in accordance with examples. It should be noted that the present invention is not limited to these examples.

Example 1

As the acid-treated graphite powder, the following acid-treated graphite powder was used. While concentrated sulfuric acid of a 98% concentration was being agitated, a 60% aqueous solution of hydrogen peroxide was added to it as a strong oxidizing agent, and this solution was used as a reaction solution. This reaction solution was cooled and kept at a temperature of 10° C., natural flake graphite powder having a particle size of 30 to 80 meshes was added to the reaction solution, and reaction was allowed to take place for 30 minutes. Subsequently, acid-treated graphite powder was separated by suction filtration, and a cleaning operation was repeated twice in which the acid-treated graphite powder was agitated in water for 10 minutes and was then subjected to suction filtration, thereby sufficiently removing the sulfuric acid content from the acid-treated graphite powder. Then, the acid-treated graphite powder with the sulfuric acid sufficiently removed was dried for 3 hours in a drying furnace held at a temperature of 110° C., and this was used as the acid-treated graphite powder.

As the graphite powder, an expanded graphite powder was used which was fabricated by cutting and pulverizing an expanded graphite sheet having a density of 1.12 Mg/m$^3$ and a thickness of 0.4 mm.

As the inorganic binder, magnesium hydrogen phosphate (dibasic magnesium phosphate) was used.

The aforementioned expanded graphite powder and acid-treated graphite powder were compounded at a mass ratio of 1:0.01, and magnesium hydrogen phosphate and distilled water were compounded at a mass ratio of 0.25:0.75 with respect to masses of the expanded graphite powder and the acid-treated graphite powder taken as 1. These components were kneaded, and a wet mixture was thereby fabricated.

By using seven austenitic stainless steel wires (SUS 304) having a wire diameter of 0.15 mm as fine metal wires, a cylindrical knitted metal wire net whose mesh size was 2.0 mm long and 1.5 mm wide or thereabouts was fabricated and was passed between a pair of rollers to form a belt-shaped metal wire net for the reinforcing member.

By using the rolling apparatus shown in FIG. 5, the belt-shaped metal wire net was inserted into the hopper of the rolling apparatus, an inserting end portion of the belt-shaped metal wire net was passed between a pair of rolling rollers, and the wet mixture was fed from conveyors to the interior of the hopper bisected by the belt-shaped metal wire net. The mixture fed into the hopper was supplied to both surfaces of the belt-shaped metal wire net and was concurrently supplied between the rolling rollers to roll the mixture between the rolling rollers, thereby fabricating a composite belt-shaped base material in which the belt-shaped metal wire net and the mixture filled and held in the meshes of the belt-shaped metal wire net were integrated.

The composite belt-shaped base material was dried in a drying furnace to evaporate and dissipate water contained in the mixture, and the composite belt-shaped base material after being dried was cut, thereby fabricating a composite belt-shaped member (the mass of the composite belt-shaped member: 32.7 g, the mass of the belt-shaped metal wire net in the composite belt-shaped member: 27.2 g, the expanded graphite powder: 4.36 g, the acid-treated graphite powder: 0.04 g, and magnesium hydrogen phosphate: 1.1 g) having a width of 63 mm and a length of 175 mm or thereabouts.

A tubular base member was fabricated by convoluting this composite belt-shaped member around the outer peripheral surface of a cylindrical core by two turns.

The tubular base member was then fitted over the stepped core of the die shown in FIG. 8, in the interior of which the hollow cylindrical portion was formed as the stepped core was fittingly inserted in the through hole of the cavity having the through hole in its interior.

The tubular base member disposed in the hollow cylindrical portion of the die was subjected to compression forming under a pressure of 196 N/mm$^2$ (2 tons/cm$^2$) in the direction of the core axis. Thus, a cylindrical gasket was fabricated which included the cylindrical inner peripheral surface defining the through hole, the cylindrical outer peripheral surface, and the annular end faces, and which had an inside diameter of 22.1 mm, an outside diameter of 29.35 mm, and a length of 25 mm. In this cylindrical gasket, the percentage contents of the reinforcing member, the heat-resistant material, and the pores were 46.9%, 34.4%, and 18.7%, respectively, in the volume ratio.

Example 2

As the acid-treated graphite powder, an acid-treated graphite powder similar to that of Example 1 described above was used; as the graphite powder, an expanded graphite powder similar to that of Example 1 described above was used; and as the inorganic binder, magnesium hydrogen phosphate was used in the same way as in Example 1 described above.

The expanded graphite powder and the acid-treated graphite powder were compounded at a mass ratio of 1:0.05, and magnesium hydrogen phosphate and distilled water were compounded at a mass ratio of 0.18:0.82 with respect to masses of the expanded graphite powder and the acid-treated graphite powder taken as 1. These components were kneaded, and a wet mixture was thereby fabricated.

As the belt-shaped metal wire net for the reinforcing member, a belt-shaped metal wire net similar to that of Example 1 described above was used.

A composite belt-shaped base material was fabricated in a method similar to that of Example 1 described above by using the wet mixture and the belt-shaped metal wire net.

The composite belt-shaped base material was dried in a drying furnace to evaporate and dissipate water contained in the mixture, and the composite belt-shaped base material after being dried was cut, thereby fabricating a composite belt-shaped member (the mass of the composite belt-shaped member: 31.92 g, the mass of the belt-shaped metal wire net in the composite belt-shaped member: 27.2 g, the expanded graphite powder: 3.81 g, the acid-treated graphite powder: 0.19 g, and magnesium hydrogen phosphate: 0.72 g) having a width of 63 mm and a length of 175 mm or thereabouts.

A tubular base member was fabricated by convoluting this composite belt-shaped member around the outer peripheral surface of a cylindrical core by two turns, and in a method similar to that of Example 1 described above a cylindrical gasket was fabricated which included the cylindrical inner peripheral surface defining the through hole, the cylindrical outer peripheral surface, and the annular end faces, and which had an inside diameter of 22.1 mm, an outside diameter of 29.35 mm, and a length of 25 mm. In this cylindrical gasket, the percentage contents of the reinforcing member, the heat-resistant material, and the pores were 46.9%, 29.4%, and 23.7%, respectively, in the volume ratio.

Example 3

As the acid-treated graphite powder, an acid-treated graphite powder similar to that of Example 1 described above was used; as the graphite powder, an expanded graphite powder similar to that of Example 1 described above was used; and as the inorganic binder, aluminum dihydrogen phosphate was used.

The expanded graphite powder and the acid-treated graphite powder were compounded at a mass ratio of 1:0.1, and aluminum dihydrogen phosphate and distilled water were compounded at a mass ratio of 0.25:0.75 with respect to masses of the expanded graphite powder and the acid-treated graphite powder taken as 1. These components were kneaded, and a wet mixture was thereby fabricated.

As the belt-shaped metal wire net for the reinforcing member, a belt-shaped metal wire net similar to that of Example 1 described above was used.

A composite belt-shaped base material was fabricated in a method similar to that of Example 1 described above by using the wet mixture and the belt-shaped metal wire net.

The composite belt-shaped base material was dried in a drying furnace to evaporate and dissipate water contained in the mixture, and the composite belt-shaped base material after being dried was cut, thereby fabricating a composite belt-shaped member (the mass of the composite belt-shaped member: 32.2 g, the mass of the belt-shaped metal wire net in the composite belt-shaped member: 27.2 g, the expanded graphite powder: 3.64 g, the acid-treated graphite powder: 0.36 g, and aluminum dihydrogen phosphate: 1 g) having a width of 63 mm and a length of 175 mm or thereabouts.

A tubular base member was fabricated by convoluting this composite belt-shaped member around the outer peripheral surface of a cylindrical core by two turns, and in a method similar to that of Example 1 described above a cylindrical gasket was fabricated which included the cylindrical inner peripheral surface defining the through hole, the cylindrical outer peripheral surface, and the annular end faces, and which had an inside diameter of 22.1 mm, an outside diameter of 29.35 mm, and a length of 25 mm. In this cylindrical gasket, the percentage contents of the reinforcing member, the heat-resistant material, and the pores were 46.9%, 33.9%, and 19.2%, respectively, in the volume ratio.

Example 4

As the acid-treated graphite powder, an acid-treated graphite powder similar to that of Example 1 described above was used; as the graphite powder, an expanded graphite powder similar to that of Example 1 described above was used; and as the inorganic binder, aluminum dihydrogen phosphate (monobasic aluminum phosphate) was used.

The expanded graphite powder and the acid-treated graphite powder were compounded at a mass ratio of 1:0.3, and aluminum dihydrogen phosphate and distilled water were compounded at a mass ratio of 0.25:0.75 with respect to masses of the expanded graphite powder and the acid-treated graphite powder taken as 1. These components were kneaded, and a wet mixture was thereby fabricated.

As the belt-shaped metal wire net for the reinforcing member, a belt-shaped metal wire net similar to that of Example 1 described above was used.

A composite belt-shaped base material was fabricated in a method similar to that of Example 1 described above by using the wet mixture and the belt-shaped metal wire net.

The composite belt-shaped base material was dried in a drying furnace to evaporate and dissipate water contained in the mixture, and the composite belt-shaped base material after being dried was cut, thereby fabricating a composite belt-shaped member (the mass of the composite belt-shaped member: 32.7 g, the mass of the belt-shaped metal wire net in the composite belt-shaped member: 27.2 g, the expanded graphite powder: 3.38 g, the acid-treated graphite powder: 1.02 g, and aluminum dihydrogen phosphate: 1.1 g) having a width of 63 mm and a length of 175 mm or thereabouts.

A tubular base member was fabricated by convoluting this composite belt-shaped member around the outer peripheral surface of a cylindrical core by two turns, and in a method similar to that of Example 1 described above a cylindrical gasket was fabricated which included the cylindrical inner peripheral surface defining the through hole, the cylindrical outer peripheral surface, and the annular end faces, and which had an inside diameter of 22.1 mm, an outside diameter of 29.35 mm, and a length of 25 mm. In this cylindrical gasket, the percentage contents of the reinforcing member, the heat-resistant material, and the pores were 46.9%, 34.8%, and 18.3%, respectively, in the volume ratio.

Example 5

As the acid-treated graphite powder, an acid-treated graphite powder similar to that of Example 1 described above was used; as the graphite powder, an expanded graphite powder similar to that of Example 1 described above was used; and as the inorganic binder, calcium dihydrogen phosphate (monobasic calcium phosphate) was used.

The expanded graphite powder and the acid-treated graphite powder were compounded at a mass ratio of 1:0.2, and calcium dihydrogen phosphate and distilled water were compounded at a mass ratio of 0.25:0.75 with respect to masses of the expanded graphite powder and the acid-treated graphite powder taken as 1. These components were kneaded, and a wet mixture was thereby fabricated.

As the belt-shaped metal wire net for the reinforcing member, a belt-shaped metal wire net similar to that of Example 1 described above was used.

A composite belt-shaped base material was fabricated in a method similar to that of Example 1 described above by using the wet mixture and the belt-shaped metal wire net.

The composite belt-shaped base material was dried in a drying furnace to evaporate and dissipate water contained in the mixture, and the composite belt-shaped base material after being dried was cut, thereby fabricating a composite belt-shaped member (the mass of the composite belt-shaped member: 32.7 g, the mass of the belt-shaped metal wire net in the composite belt-shaped member: 27.2 g, the expanded graphite powder: 3.67 g, the acid-treated graphite powder: 0.73 g, and calcium dihydrogen phosphate: 1.1 g) having a width of 63 mm and a length of 175 mm or thereabouts.

A tubular base member was fabricated by convoluting this composite belt-shaped member around the outer peripheral surface of a cylindrical core by two turns, and in a method similar to that of Example 1 described above a cylindrical gasket was fabricated which included the cylindrical inner peripheral surface defining the through hole, the cylindrical outer peripheral surface, and the annular end faces, and which had an inside diameter of 22.1 mm, an outside diameter of 29.35 mm, and a length of 25 mm. In this cylindrical gasket, the percentage contents of the reinforcing member, the heat-resistant material, and the pores were 46.9%, 34.0%, and 19.1%, respectively, in the volume ratio.

Example 6

As the acid-treated graphite powder, an acid-treated graphite powder similar to that of Example 1 described above was used; as the graphite powder, an expanded graphite powder similar to that of Example 1 described above was used; and as the inorganic binder, calcium hydrogen phosphate (dibasic calcium phosphate) was used.

The expanded graphite powder and the acid-treated graphite powder were compounded at a mass ratio of 1:0.1, and calcium hydrogen phosphate and distilled water were compounded at a mass ratio of 0.2:0.8 with respect to masses of the expanded graphite powder and the acid-treated graphite powder taken as 1. These components were kneaded, and a wet mixture was thereby fabricated.

As the belt-shaped metal wire net for the reinforcing member, a belt-shaped metal wire net similar to that of Example 1 described above was used.

A composite belt-shaped base material was fabricated in a method similar to that of Example 1 described above by using the wet mixture and the belt-shaped metal wire net.

The composite belt-shaped base material was dried in a drying furnace to evaporate and dissipate water contained in the mixture, and the composite belt-shaped base material after being dried was cut, thereby fabricating a composite belt-shaped member (the mass of the composite belt-shaped member: 32.0 g, the mass of the belt-shaped metal wire net in the composite belt-shaped member: 27.2 g, the expanded graphite powder: 3.64 g, the acid-treated graphite powder: 0.36 g, and calcium hydrogen phosphate: 0.8 g) having a width of 63 mm and a length of 175 mm or thereabouts.

A tubular base member was fabricated by convoluting this composite belt-shaped member around the outer peripheral surface of a cylindrical core by two turns, and in a method similar to that of Example 1 described above a cylindrical gasket was fabricated which included the cylindrical inner peripheral surface defining the through hole, the cylindrical outer peripheral surface, and the annular end faces, and which had an inside diameter of 22.1 mm, an outside diameter of 29.35 mm, and a length of 25 mm. In this cylindrical gasket, the percentage contents of the reinforcing member, the heat-resistant material, and the pores were 46.9%, 29.4%, and 23.7%, respectively, in the volume ratio.

Example 7

As the acid-treated graphite powder, an acid-treated graphite powder similar to that of Example 1 described above was used; as the graphite powder, an expanded graphite powder similar to that of Example 1 described above was used; and as the inorganic binder, phosphoric acid ($H_3PO_4$: 75% aqueous solution) was used.

The expanded graphite powder and the acid-treated graphite powder were compounded at a mass ratio of 1:0.3, and phosphoric acid was compounded at a mass ratio of 0.25 with respect to masses of the expanded graphite powder and the acid-treated graphite powder taken as 1. These components were kneaded, and a wet mixture was thereby fabricated.

As the belt-shaped metal wire net for the reinforcing member, a belt-shaped metal wire net similar to that of Example 1 described above was used.

A composite belt-shaped base material was fabricated in a method similar to that of Example 1 described above by using the wet mixture and the belt-shaped metal wire net.

The composite belt-shaped base material was dried in a drying furnace to evaporate and dissipate water contained in the mixture, and the composite belt-shaped base material after being dried was cut, thereby fabricating a composite belt-shaped member (the mass of the composite belt-shaped member: 32.2 g, the mass of the belt-shaped metal wire net in the composite belt-shaped member: 27.2 g, the expanded graphite powder: 3.1 g, the acid-treated graphite powder: 0.9 g, and phosphoric acid: 1 g) having a width of 63 mm and a length of 175 mm or thereabouts.

A tubular base member was fabricated by convoluting this composite belt-shaped member around the outer peripheral surface of a cylindrical core by two turns, and in a method similar to that of Example 1 described above a cylindrical gasket was fabricated which included the cylindrical inner peripheral surface defining the through hole, the cylindrical outer peripheral surface, and the annular end faces, and which had an inside diameter of 22.1 mm, an outside diameter of 29.35 mm, and a length of 25 mm. In this cylindrical gasket, the percentage contents of the reinforcing member, the heat-resistant material, and the pores were 46.9%, 32.4%, and 20.7%, respectively, in the volume ratio.

Example 8

As the acid-treated graphite powder, an acid-treated graphite powder similar to that of Example 1 described above was used; as the graphite powder, an expanded graphite powder similar to that of Example 1 described above was used; and as the inorganic binder, magnesium hydrogen phosphate was used in the same way as in Example 1 described above.

The expanded graphite powder and the acid-treated graphite powder were compounded at a mass ratio of 1:0.5, and magnesium hydrogen phosphate and distilled water were compounded at a mass ratio of 0.25:0.75 with respect to masses of the expanded graphite powder and the acid-treated graphite powder taken as 1. These components were kneaded, and a wet mixture was thereby fabricated.

As the belt-shaped metal wire net for the reinforcing member, a belt-shaped metal wire net similar to that of Example 1 described above was used.

A composite belt-shaped base material was fabricated in a method similar to that of Example 1 described above by using the wet mixture and the belt-shaped metal wire net.

The composite belt-shaped base material was dried in a drying furnace to evaporate and dissipate water contained in the mixture, and the composite belt-shaped base material after being dried was cut, thereby fabricating a composite belt-shaped member (the mass of the composite belt-shaped member: 32.2 g, the mass of the belt-shaped metal wire net in the composite belt-shaped member: 27.2 g, the expanded graphite powder: 2.67 g, the acid-treated graphite powder: 1.33 g, and magnesium hydrogen phosphate: 1.0 g) having a width of 63 mm and a length of 175 mm or thereabouts.

A tubular base member was fabricated by convoluting this composite belt-shaped member around the outer peripheral surface of a cylindrical core by two turns, and in a method similar to that of Example 1 described above a cylindrical gasket was fabricated which included the cylindrical inner peripheral surface defining the through hole, the cylindrical outer peripheral surface, and the annular end faces, and which had an inside diameter of 22.1 mm, an outside diameter of 29.35 mm, and a length of 25 mm. In this cylindrical gasket, the percentage contents of the reinforcing member, the heat-resistant material, and the pores were 46.9%, 31.3%, and 21.8%, respectively, in the volume ratio.

Comparative Example 1

A strip-shaped expanded graphite sheet piece for the heat-resistant material was prepared which had a density of 1.2 Mg/m$^3$ and a thickness of 0.4 mm and was cut into a size of 75 mm in width and 257 mm in length.

By using one austenitic stainless steel wire (SUS 304) having a wire diameter of 0.15 mm as a fine metal wire, a cylindrical knitted metal wire net whose mesh size was 4.00 mm long and 3.0 mm wide or thereabouts was fabricated and was passed between a pair of rollers to form a continuous belt-shaped metal wire net with a width of 68 mm, and this metal wire net was cut into a size of 257 mm in length and was used as the belt-shaped metal wire net for the reinforcing member.

A superposed assembly was fabricated in which an expanded graphite sheet piece and a belt-shaped metal wire net were superposed on each other such that the expanded graphite sheet piece projected in the widthwise direction from both widthwise ends of the belt-shaped metal wire net for the reinforcing member, which serve as annular end faces of the cylindrical gasket, and such that one lengthwise end of the expanded graphite sheet piece and a lengthwise end of the expanded graphite sheet piece corresponding to that one end were aligned.

The superposed assembly was convoluted around the outer peripheral surface of the cylindrical core with the expanded graphite sheet piece placed on the inner side such that the expanded graphite sheet piece was convoluted with one more turn, thereby forming a tubular base member in which the expanded graphite sheet piece was exposed on both the inner peripheral surface side and the outer peripheral surface side. In this tubular base member, both widthwise end portions of the expanded graphite sheet piece respectively projected from the belt-shaped metal wire net in the widthwise direction thereof.

The die was prepared which is shown in FIG. 8 and in the interior of which the hollow cylindrical portion was formed as the stepped core was fittingly inserted in the through hole of the cavity having the through hole in its interior, and the tubular base member was fitted over the stepped core of the die.

The tubular base member disposed in the hollow cylindrical portion of the die was subjected to compression forming under a pressure of 196 N/mm$^2$ (2 tons/cm$^2$) in the direction of the core axis. Thus, a cylindrical gasket was fabricated which included the cylindrical inner peripheral surface defining the through hole, the cylindrical outer peripheral surface, and the annular end faces, and which had an inside diameter of 22.1 mm, an outside diameter of 29.4 mm, and a length of 25 mm. In this cylindrical gasket, the percentage contents of the reinforcing member formed by the compressed belt-shaped metal wire net, the heat-resistant material formed by the similarly compressed expanded graphite sheet piece, and the pores were 9.8% for the reinforcing member, 49.6% for the heat-resistant material, and 40.5% for the pores in the volume ratio.

Comparative Example 2

An expanded graphite sheet piece for the heat-resistant material similar to that of Comparative Example 1 described above was prepared.

By using as fine metal wires seven austenitic stainless steel wires having a wire diameter of 0.15 mm and similar to that of Comparative Example 1 described above, a cylindrical knitted metal wire net whose mesh size was 4.00 mm long and 3.0 mm wide or thereabouts was fabricated and was passed between a pair of rollers to form a continuous belt-shaped metal wire net with a width of 68 mm, and this metal wire net was cut into a size of 257 mm in length and was used as the belt-shaped metal wire net for the reinforcing member.

Thereafter, in a method similar to that of Comparative Example 1 described above, a cylindrical gasket was fabricated which had an inside diameter of 22.1 mm, an outside diameter of 29.4 mm, and a length of 25 mm. In this cylindrical gasket, the percentage contents of the reinforcing member, the heat-resistant material, and the pores were 43.4% for the reinforcing member, 15.1% for the heat-resistant material, and 41.5% for the pores in the volume ratio.

Next, a test was conducted on the amount of gas leakage (1/min) and a rate of decline (%) of the tightening torque by the fastening band by incorporating each of the cylindrical gaskets obtained in Examples 1 to 8 and Comparative Examples 1 and 2 described above into the insertion-type exhaust pipe spherical joint shown in FIG. 9.

<Test Conditions of Gas Leakage Amount and Test Method>
<Test Conditions of Gas Leakage Amount>
Tightening force by the fastening band: 12 N·m
Excitation angle: ±0.5° (with the inner pipe fixed)
Excitation frequency (oscillation velocity): 50 Hz
Temperature (outer surface temperature of the inner pipe shown in FIG. 9):
from room temperature (25° C.) to 500° C.
Test time: 24 hrs.
<Test Method of Gas Leakage Amount>

The temperature was raised up to 500° C. in 1 hour while continuing the oscillating motion at ±0.5° at an excitation frequency of 50 Hz at room temperature (25° C.). The oscillating motion was continued at that temperature held for 22 hours, and after the lapse of 22 hours the temperature was lowered to room temperature in 1 hour. Measurement was made of the amount of gas leakage at room temperature (before the test start) and the amount of gas leakage after the lapse of the test time of 24 hours.

<Measurement Method of Gas Leakage Amount>

An opening of the outer pipe of the insertion-type exhaust pipe joint shown in FIG. 9 was closed, and dry air was allowed to flow in from the inner pipe side under a pressure of 30 kPa. The amount of gas leakage from the joint portion (gap between the inner pipe and the outer pipe) was measured by a flowmeter 2 times, i.e., (1) at an early period of the test (immediately after the test start) and (2) after the lapse of 24 hours of the test.

Tables 1 to 3 show the results of the above-described test.

TABLE 1

| | | Examples | | | |
|---|---|---|---|---|---|
| | | 1 | 2 | 3 | 4 |
| Porosity (volume %) | | 18.7 | 23.7 | 19.2 | 18.3 |
| Amount of gas leakage | (1) | 0.12 | 0.16 | 0.12 | 0.12 |
| | (2) | 0.21 | 0.26 | 0.20 | 0.20 |
| Rate of decline of tightening torque (%) | | 7.8 | 9.4 | 7.8 | 7.8 |

TABLE 2

|  |  | Examples | | | |
|---|---|---|---|---|---|
|  |  | 5 | 6 | 7 | 8 |
| Porosity (volume %) |  | 19.1 | 23.7 | 20.7 | 21.8 |
| Amount of gas leakage | (1) | 0.12 | 0.17 | 0.11 | 0.14 |
|  | (2) | 0.21 | 0.24 | 0.18 | 0.22 |
| Rate of decline of tightening torque (%) |  | 7.9 | 9.6 | 7.4 | 8.7 |

TABLE 3

|  |  | Comparative Examples | |
|---|---|---|---|
|  |  | 1 | 2 |
| Porosity (volume %) |  | 40.5 | 41.5 |
| Amount of gas leakage | (1) | 0.09 | 0.20 |
|  | (2) | 9.26 | 6.57 |
| Rate of decline of tightening torque (%) |  | 46 | 12 |

From the test results shown in Tables 1 to 3, it can be appreciated that the cylindrical gaskets in accordance with Examples 1 to 8 are superior to the cylindrical gaskets in accordance with Comparative Examples 1 and 2 in terms of the amount of gas leakage and the rate of decline of the tightening torque. The amounts of gas leakage of the cylindrical gaskets in accordance with respective Examples exhibited a tendency of being greater than the amount of gas leakage of the cylindrical gasket in accordance with Comparative Example 1 immediately after the test start; however, the amounts of gas leakage of the cylindrical gaskets in accordance with respective Examples exhibited a decreasing tendency with the lapse of the test time, and the amounts of their gas leakage after the lapse of 24 hours were extremely low. This is presumably attributable to the fact that each of these cylindrical gaskets underwent expansion in volume due to the temperature rise of the exhaust pipe with the lapse of the test time, and the volume expansion of the cylindrical gasket caused the inner and outer peripheral surfaces of the cylindrical gasket to be brought into tight contact with the cylindrical outer peripheral surface of the inner pipe and the cylindrical inner peripheral surface of the outer pipe therebetween to be blocked, thereby decreasing the gas leakage from that gap.

In contrast, the cylindrical gasket in accordance with Comparative Example 1 exhibited a tendency for the amount of gas leakage to increase with the lapse of the test time, and this is presumably attributable to the fact that the rate of decline of the tightening torque decreased to less than half of the initial level, with the result that permanent set occurred in the cylindrical gasket, increasing the gap between the two members. In addition, the cylindrical gasket in accordance with Comparative Example 2 was a gasket specialized in the rigidity, and a large difference in the rate of decline of the tightening torque was not noted as compared to the cylindrical gaskets in accordance with respective Examples, but the cylindrical gasket in accordance with Comparative Example 2 exhibited a tendency of a large amount of gas leakage through the test time from immediately after the test start until after the lapse of 24 hours.

As described above, in the cylindrical gasket in accordance with the present invention, the reinforcing member and the heat-resistant material are intertwined with each other so as to be provided with structural integrity, the reinforcing member is contained densely in a radial direction from a cylindrical inner peripheral surface to a cylindrical outer peripheral surface, and the percentage contents of the reinforcing member, the heat-resistant material, and the pores were 32 to 60% for the reinforcing member, 5 to 58% for the heat-resistant material, and 10 to 35% for the pores in the volume ratio. Therefore, the cylindrical gasket in accordance with the present invention has rigidity with respect to the tightening force due to the fastening band and the load due to vibrations. In addition, the meshes of the metal wire net of that reinforcing member are filled with the heat-resistant material, and the cylindrical gasket, when incorporated in the insertion-type exhaust pipe joint, undergoes expansion in volume owing to the thermal action of exhaust gases flowing through the exhaust pipe, so that the inner and outer peripheral surfaces of the cylindrical gasket are brought into tight contact with the cylindrical outer peripheral surface of the inner pipe and the cylindrical inner peripheral surface of the outer pipe to thereby block the gap between the two members. Hence, the cylindrical gasket in accordance with the present invention also excels in the sealability of the gap between the exhaust pipe and the cylindrical gasket. Accordingly, the cylindrical gasket in accordance with the present invention, when incorporated in the insertion-type exhaust pipe joint and even if tightened firmly by the fastening band, does not produce such defects as the permanent set, and even when, due to traveling on a rough road, the joint portion is repeatedly subjected to vibrational load and bending torque, and prying repeatedly occurs between the inner and outer pipes, the cylindrical gasket is able to prevent gas leakage from the joint portion of the exhaust pipe as practically as possible.

DESCRIPTION OF REFERENCE NUMERALS

1: mixture
2: cylindrical metal wire net
5: belt-shaped metal wire net
15: tubular base member
17: cavity
18: stepped core
19: hollow cylindrical portion
20: die
21: punch
27: cylindrical gasket

The invention claimed is:
1. A cylindrical gasket for use in an insertion-type exhaust pipe joint, comprising: a reinforcing member made from a compressed metal wire net; a heat-resistant material filled in meshes of the metal wire net of said reinforcing member and containing expanded graphite, acid-treated graphite prior to expansion treatment; and an inorganic binder being selected from at least one of aluminum dihydrogen phosphate, magnesium hydrogen phosphate, calcium dihydrogen phosphate, calcium hydrogen phosphate, and phosphoric acid which are compressed; and pores which are dispersedly distributed in said reinforcing member and said heat-resistant material, wherein said reinforcing member and said heat-resistant material are intertwined with each other so as to be provided with structural integrity, said reinforcing member is contained densely in a radial direction from a cylindrical inner peripheral surface to a cylindrical outer peripheral surface, and with respect to a total volume of said cylindrical gasket, said reinforcing member occupies a volume of 32 to 60%, said heat-resistant material occupies a volume of 5 to 58%, and said pores occupy a volume of 10 to 35% and
wherein a mass ratio between the expanded graphite and the acid-treated graphite prior to expansion treatment is 1:0.01 to 0.5, and a mass ratio between the expanded graphite and the acid-treated graphite prior to expansion treatment, on the one hand, and the inorganic binder, on the other hand, is 1:0.1 to 1.

2. An insertion-type exhaust pipe joint comprising: an outer pipe having a pipe end portion, an enlarged-diameter cylindrical portion provided with an enlarged diameter at said pipe end portion via an annular shoulder portion, an open end portion provided at one axial end portion of the enlarged-diameter cylindrical portion, a flange portion provided on an outer peripheral surface of the open end portion in such a manner as to extend radially outwardly, and a plurality of slits provided in the enlarged-diameter cylindrical portion and in the flange portion in such a manner as to extend axially from an annular end face of the open end portion and to be arranged equidistantly in a circumferential direction; an inner pipe having a pipe end portion which is passed through an interior of the enlarged-diameter cylindrical portion of said outer pipe and is fitted at one axial end portion thereof to the pipe end portion of said outer pipe, and a flange which is provided uprightly on an outer peripheral surface of another axial end portion of the pipe end portion; said cylindrical gasket according to claim 1 which is fitted in an annular gap between a cylindrical outer surface of the pipe end portion of said inner pipe and a cylindrical inner surface of the enlarged-diameter cylindrical portion of said outer pipe; and a fastening band which is disposed on a cylindrical outer surface of the enlarged-diameter cylindrical portion of said outer pipe so as to press the cylindrical inner surface of the enlarged-diameter cylindrical portion of said outer pipe against the cylindrical outer peripheral surface of said cylindrical gasket by being tightened, through which pressing said fastening band presses the cylindrical inner peripheral surface of said cylindrical gasket against the cylindrical outer surface of the pipe end portion of said inner pipe, wherein, in the annular gap, said cylindrical gasket disposed with an annular end face of one axial end portion thereof abutting against the flange of said inner pipe is so arranged that the acid-treated graphite prior to expansion treatment contained in the heat-resistant material is adapted to undergo expansion in volume owing to the heat of exhaust gases flowing through said inner pipe, so as to seal a gap between the cylindrical outer peripheral surface of the cylindrical gasket and a cylindrical inner peripheral surface of the enlarged-diameter cylindrical portion of said outer pipe and a gap between the cylindrical inner peripheral surface of the cylindrical gasket and the cylindrical outer surface of the pipe end portion of said inner pipe and to seal a space formed by one end face of the cylindrical gasket, the pipe end portion of said inner pipe, and the annular shoulder portion of the enlarged-diameter portion of said outer pipe.

* * * * *